United States Patent
Krammer

(10) Patent No.: US 11,358,482 B2
(45) Date of Patent: Jun. 14, 2022

(54) ELECTRICAL POWER SUPPLY FOR A STATIONARY VEHICLE, AND ON-BOARD INDUCTION COIL CONNECTED TO THE LOW-VOLTAGE ON-BOARD ELECTRICAL SYSTEM

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/998,364

(22) Filed: Dec. 23, 2015

(65) Prior Publication Data

US 2016/0137073 A1    May 19, 2016

Related U.S. Application Data

(63) Continuation of application No. PCT/EP2014/063324, filed on Jun. 25, 2014.

(30) Foreign Application Priority Data

Jun. 25, 2013  (DE) .......................... 102013212007.9

(51) Int. Cl.
*B60L 53/12* (2019.01)
*H02J 50/10* (2016.01)
*B60L 58/20* (2019.01)

(52) U.S. Cl.
CPC ............... *B60L 53/12* (2019.02); *B60L 58/20* (2019.02); *H02J 50/10* (2016.02); *Y02T 10/70* (2013.01); *Y02T 10/7072* (2013.01); *Y02T 90/12* (2013.01)

(58) Field of Classification Search
CPC .... B60L 11/182; B60L 11/1868; B60L 53/12; B60L 58/20; Y02T 90/122; Y02T 90/14;
(Continued)

(56) References Cited

U.S. PATENT DOCUMENTS

| 4,800,328 A | * | 1/1989 | Bolger | .................... B60L 5/005 |
| | | | | 320/135 |
| 5,157,319 A | * | 10/1992 | Klontz | .................... H02J 50/10 |
| | | | | 320/108 |

(Continued)

FOREIGN PATENT DOCUMENTS

| CN | 102712267 A | 10/2012 |
| CN | 102882282 A | 1/2013 |

(Continued)

OTHER PUBLICATIONS

PCT/EP2014/063324, International Search Report dated Jan. 5, 2015 (Three (3) pages).

(Continued)

*Primary Examiner* — Richard Isla
*Assistant Examiner* — Manuel Hernandez
(74) *Attorney, Agent, or Firm* — Crowell & Moring LLP

(57) ABSTRACT

A system includes a vehicle and an induction unit external to the vehicle. The induction unit includes a primary coil designed as a primary induction coil, and the vehicle includes a low voltage on-board electrical system having a secondary coil designed as a secondary induction coil. An alternating voltage can be induced in at least one part of the low-voltage on-board electrical system by the electromagnetic coupling of the secondary coil to the primary coil, and at least one component of the low-voltage on-board electrical system can be fed with the induced alternating voltage or with direct voltage via a rectifier.

17 Claims, 2 Drawing Sheets

(58) Field of Classification Search
CPC ............. Y02T 10/7072; Y02T 10/7005; Y02T 10/7066; Y02T 10/70; Y02T 90/12; H02J 50/10
USPC .......................................................... 320/108
See application file for complete search history.

(56) References Cited

U.S. PATENT DOCUMENTS

| | | | |
|---|---|---|---|
| 5,617,003 | A | 4/1997 | Odachi et al. |
| 5,869,910 | A * | 2/1999 | Colens .................... H02J 50/90 |
| | | | 307/104 |
| 7,781,916 | B2 * | 8/2010 | Boys ........................ H02J 5/005 |
| | | | 307/104 |
| 10,741,325 | B2 * | 8/2020 | Boys ...................... H04B 5/0037 |
| 2002/0117368 | A1 * | 8/2002 | Ogasawara ............. B60L 1/003 |
| | | | 191/2 |
| 2007/0120421 | A1 * | 5/2007 | Boys ........................ H02J 5/005 |
| | | | 307/11 |
| 2010/0072946 | A1 | 3/2010 | Sugano |
| 2010/0181964 | A1 * | 7/2010 | Huggins .................. H02J 17/00 |
| | | | 320/108 |
| 2012/0068663 | A1 * | 3/2012 | Tanikawa ............ B60L 11/1816 |
| | | | 320/109 |
| 2012/0126745 | A1 * | 5/2012 | Partovi ................. H02J 7/0027 |
| | | | 320/108 |
| 2012/0169135 | A1 | 7/2012 | Yamamoto et al. |
| 2012/0235605 | A1 * | 9/2012 | Jang .................... B60L 11/1803 |
| | | | 318/139 |
| 2013/0015699 | A1 | 1/2013 | Mita |
| 2013/0088194 | A1 * | 4/2013 | Hunter ................. B60L 11/182 |
| | | | 320/108 |
| 2014/0015328 | A1 * | 1/2014 | Beaver ................. B60L 11/182 |
| | | | 307/104 |
| 2014/0035382 | A1 * | 2/2014 | Covic .................... H02J 50/12 |
| | | | 307/104 |
| 2014/0042821 | A1 * | 2/2014 | Boys .................... H04B 5/0081 |
| | | | 307/104 |
| 2015/0069963 | A1 * | 3/2015 | Ichikawa .................. B60L 1/02 |
| | | | 320/108 |
| 2015/0372499 | A1 * | 12/2015 | Purcarea ............... H02M 7/217 |
| | | | 307/104 |

FOREIGN PATENT DOCUMENTS

| | | |
|---|---|---|
| DE | 33 05 224 A1 | 8/1984 |
| DE | 11 2008 000 980 T5 | 2/2010 |
| DE | 10 2011 119 905 A1 | 6/2013 |
| EP | 2 196 351 A1 | 6/2010 |
| EP | 2 575 264 A1 | 4/2013 |
| JP | 2010-73976 A | 4/2010 |
| JP | 2010-226946 A | 10/2010 |
| WO | WO 2011/086445 A2 | 7/2011 |

OTHER PUBLICATIONS

German Search Report issued in counterpart application No. DE 10 2013 212 007.9 dated Sep. 17, 2013, with Statement of Relevancy (Five (5) pages).
Chinese Office Action issued in Chinese counterpart application No. 201480033017.5 dated Nov. 3, 2017 (Eight (8) pages).
Chinese Office Action issued in Chinese counterpart application No. 201480033017.5 dated May 29, 2018, with partial English translation (Nine (9) pages).
Chinese Office Action issued in Chinese counterpart application No. 201480033017.5 dated Feb. 2, 2019 (Ten (10) pages).

* cited by examiner

ELECTRICAL POWER SUPPLY FOR A STATIONARY VEHICLE, AND ON-BOARD INDUCTION COIL CONNECTED TO THE LOW-VOLTAGE ON-BOARD ELECTRICAL SYSTEM

CROSS REFERENCE TO RELATED APPLICATIONS

This application is a continuation of PCT International Application No. PCT/EP2014/063324, filed Jun. 25, 2014, which claims priority under 35 U.S.C. § 119 from German Patent Application No. 10 2013 212 007.9, filed Jun. 25, 2013, the entire disclosures of which are herein expressly incorporated by reference.

BACKGROUND AND SUMMARY OF THE INVENTION

The invention relates to a system comprising a vehicle and a vehicle-external induction unit.

Inductive charging systems comprising a primary coil for vehicles having an electrified drive train are described in the prior art (for example U.S. Pat. No. 5,617,003 A). The vehicle or a traction battery of the vehicle is charged using an induction unit, which is located outside the vehicle. The energy transmission takes place via an electromagnetic coupling between a primary coil of the induction unit and a secondary coil of the vehicle.

An object of the invention consists in describing an improved system comprising a vehicle and a vehicle-external induction unit.

In accordance with the invention, the induction unit comprises a primary coil, which is in the form of a primary induction coil, and the vehicle comprises a low-voltage vehicle electrical distribution system comprising a secondary coil, which is in the form of a secondary induction coil, wherein an AC electric voltage can be induced in at least part of the low-voltage vehicle electrical distribution system by electromagnetic coupling of the secondary coil to the primary coil, and the induced AC voltage or, via a rectifier, direct voltage can be fed to at least one component of the low-voltage vehicle electrical distribution system.

This means that the voltage induced in the secondary coil can be supplied directly to components from the low-voltage vehicle electrical distribution system, i.e. without any conversion or matching of the induced voltage level. If appropriate, the induced voltage is rectified.

It is furthermore advantageous if the secondary coil is located in an underfloor region of the vehicle, the primary coil is embodied close to the floor, the electromagnetic coupling can be produced via an air gap between the primary coil and the secondary coil when the vehicle is at a standstill, and electric power can be transmitted from the induction unit to the vehicle when the electromagnetic coupling is produced.

An embodiment close to the floor means that the primary coil is integrated or can be placed in the region of the surface of a roadway or a parking space. It may thus be a primary coil fixedly integrated at a space which is suitable and designed for charging an electric vehicle. Alternatively, a movable primary coil can also be designed which can be positioned beneath the vehicle in the region of the secondary coil and therefore partially fills the vehicle underfloor when positioned there.

In addition, it is particularly advantageous if a tuning capacitor is connected in parallel with the secondary coil, with it being possible for the induced AC voltage to be tapped off at said tuning capacitor.

Alternative coupling-out possibilities for tapping off the induced AC voltage are also possible. The tuning capacitor takes on the function of a resonant capacitor. More complex LC networks can be used in the case of specific EMC requirements, for example.

An alternative is provided if a tuning capacitor is connected in series with the secondary coil and an electrical load is connected downstream of this circuit.

The downstream electrical load can be provided by a low-rating electrical consumer.

In addition, the induction unit can be supplied electric power from an AC voltage grid, and a radiofrequency electromagnetic oscillation can be set at the primary coil by the induction unit.

The power regulation of the induction unit advantageously takes place with the power requirement for induced electric power in the low-voltage electrical distribution system of the vehicle as the controlled variable.

For example, a seat heater with a power of 50 watts to 100 watts is integrated in the low-voltage vehicle electrical distribution system as electrical consumer with a comparatively low power requirement (low-rating consumer). A consumer with a comparatively high power requirement is, for example, a heating element for a parking heater having a power of the order of magnitude of more than one kilowatt.

When the vehicle is at a standstill and when the electromagnetic coupling has been produced, the induction unit is regulated on the basis of the power demand of the heating element. For this purpose, a cable-free data link can be produced between the induction unit and the vehicle. The cable-free data link is in the form of a WLAN link or bluetooth link, for example. The regulation and control of the induction unit is expediently performed in vehicle-external fashion on the basis of the communicated power demand of the vehicle as controlled variable in order to keep the electrics/electronics volumes in the vehicle as simple as possible.

The heating element can be used, for example, as a central heating element of a parking heater. By virtue of such a heating element, the induced AC voltage is directly useable, i.e. without any transformation, conversion, rectification or the like.

Another embodiment is achievable when the vehicle comprises, in addition to the secondary coil, at least one further ancillary coil identical to the secondary coil.

These auxiliary coils can supply induced voltage in each case to different applications independently of one another.

In accordance with another variant of the invention, the at least one component to which the induced AC voltage can be fed is a transformer comprising a transformer primary coil and comprising a transformer secondary coil, wherein the transformer primary coil is assigned to the induced AC voltage, and a rectifier is connected downstream of the transformer secondary coil.

By virtue of this variant, the induced AC voltage can be converted into a rectified voltage with a voltage level which is determined presettably by the transformer. The advantage of this variant is provided by greater variability in the supply to different components in the low-voltage vehicle electrical distribution system.

It is particularly advantageous if the secondary coil and the at least one ancillary coil have a common ferrite core.

As a result, a high degree of energy efficiency of the system can be achieved with at the same time a minimum requirement for installation space for the secondary unit in the vehicle.

If a voltage regulator is connected downstream of the at least one auxiliary coil, further regulation for the voltage supply of low-rating consumers in the low-voltage vehicle electrical distribution system can be realized independently of the regulation of a consumer with a comparatively high power requirement, such as a parking heater heating element.

Expediently, the low-voltage vehicle electrical distribution system has a rated voltage level of 12-16 volts. Future alternative vehicle electrical distribution systems also use, if appropriate as an alternative or in addition, a voltage level of 48 volts.

It is moreover advantageous if the vehicle is in the form of an internal combustion engine vehicle having a vehicle electrical distribution system with a single voltage level (for example 12-16 volts—vehicle electrical distribution system), wherein the vehicle-external induction unit is suitable for the inductive energy supply to this vehicle and the vehicle-external induction unit is additionally suitable for charging a traction battery of a vehicle comprising an electrified drive train.

The possibility of the vehicle-external induction unit of different vehicle types being used for inductive energy transmission is therefore also included. A conventional vehicle with purely an internal combustion engine drive can use the inductively transmittable energy for supplying power to the low-voltage vehicle electrical distribution system. A vehicle comprising an electrified drive train and comprising a traction battery can use the inductively transmittable energy for charging the traction battery in a high-voltage vehicle electrical distribution system and possibly also for supplying power to components in a low-voltage vehicle electrical distribution system.

The invention is based on the considerations outlined below.

Modern vehicle development is concerned with cable-free charging systems on the basis of inductive energy transmission for BEVs (battery electric vehicles) and PHEVs (plug-in hybrid electric vehicles). These systems are generally configured in such a way that a high-voltage store in a high-voltage vehicle electrical distribution system can be charged.

In addition, there is the possibility of performing preconditioning of the interior air conditioning system with the energy from the electricity grid, for example. Likewise, components of a low-voltage vehicle electrical distribution system, such as comfort systems or recharging of the 12 volt battery from the electricity grid via a DC chopper can be supplied power when the vehicle is parked.

Charging methods for BEVs and PHEVs are largely completely automated charging methods. Each time the vehicle is parked in a suitable position with respect to a primary unit of the inductive charging system, the connection to the electricity grid is produced automatically. Thus, sufficient electrical energy is available to the vehicle when parked.

Inductive charging systems consist of the vehicle-external primary unit and a vehicle-side secondary unit. A wide distribution of the inductive charging infrastructure is possible when any desired vehicles can be charged via their secondary units via any desired vehicle-external primary units.

One disadvantage with present-day inductive charging systems is the fact that these systems are predominantly exclusively reserved for BEVs and PHEVs. The primary units can only be used for BEVs and PHEVs. Owing to the high costs and system complexity, use in connection with conventional vehicles without an electrified drive train is in practice virtually unrealizable, or only with a high level of technical complexity.

A conventional internal combustion engine vehicle without a high-voltage vehicle electrical distribution system for electric traction is proposed which is provided with a secondary unit for an inductive charging system. This is a modified secondary system of a BEV and PHEV. This system enables a supply of energy to the vehicle when parked from an external energy source. In this way, preconditioning, power supply to 12 volt consumers, for example for temporally unlimited online functions and stationary functions as well as backup for or recharging of the 12 volt vehicle electrical distribution system battery are possible. This system is adaptable to vehicles with any desired voltage level of the low-voltage vehicle electrical distribution system, such as, for example, 12 volts, 36 volts or 48 volts.

The invention is characterized by the fact that the induced voltage can be used directly, i.e. without any conversion, in the vehicle. Voltage conversion is therefore dispensed with by virtue of a clever system configuration which can comprise a rectifier. In addition, the regulation provided in the inductive transmission system can be used directly for regulating the connected consumers in the vehicle.

Such a system can be used for various applications. In addition to the direct operation of consumers, a small power component can be used in the vehicle for supplying power to low-rating consumers in the low-voltage vehicle electrical distribution system. In order to supply power to low-voltage consumers, alternatively the AC voltage from the inductive transmission system can be converted directly in a transformer. This is possible with great efficiency owing to the high frequency used and ensures galvanic decoupling, which contributes to high-voltage safety. In addition, a separate tap for an AC voltage with a different voltage across the secondary coil can be realized in order to reduce the system complexities in the case of power supply to low-voltage volumes. By introducing inductive charging systems which are active at traffic light stops and during travel, this system can also be used for the additional supply of energy to auxiliary consumers in conventional vehicles. It also enables simplified supply of power to the low-voltage vehicle electrical distribution system with a rectifier using the regulation capacity of the inductive transmission system.

Possible low-voltage volumes which can be electrically operated by this system can be provided, for example, by parking heating of the vehicle interior without direct production of emissions, support for the vehicle electrical distribution system for standstill functions (for example date update of the vehicle) with at the same time concomitant use of a communications interface of the inductive charging system or by recharging of existing small stores, for example a 12 volt vehicle electrical distribution system battery.

This results in a reduction in the consumption of conventional vehicles as a result of the charged vehicle electrical distribution system battery or in a reduction in the number of battery warranty cases owing to an absent high battery loading by parking consumers.

A preferred exemplary embodiment of the invention will be described below with reference to the attached drawings.

Further details, preferred embodiments and developments of the invention are set forth therein. Specifically, in each case schematically, Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
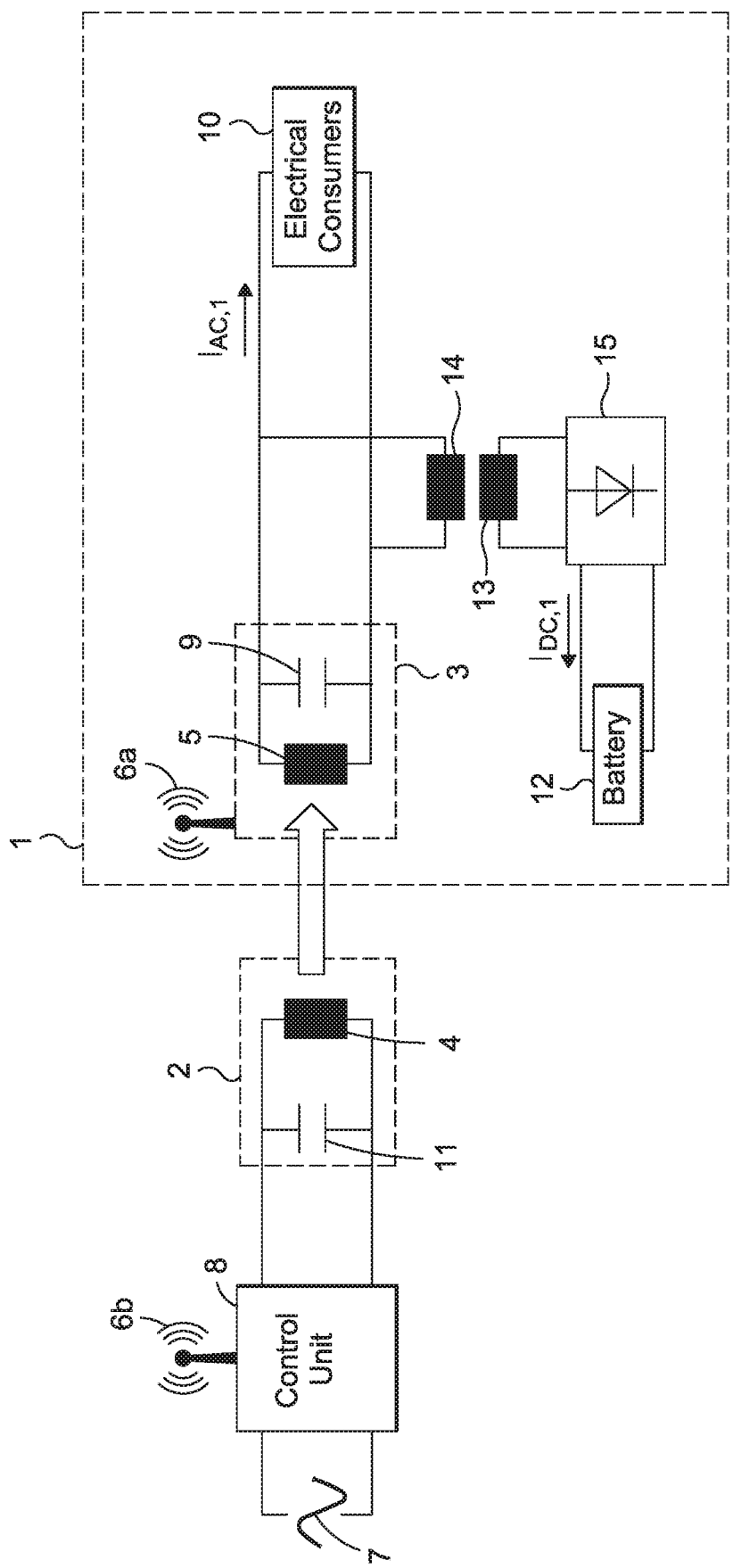
FIG. 1 shows a system for inductively supplying energy to a conventional vehicle.
Figure 2:
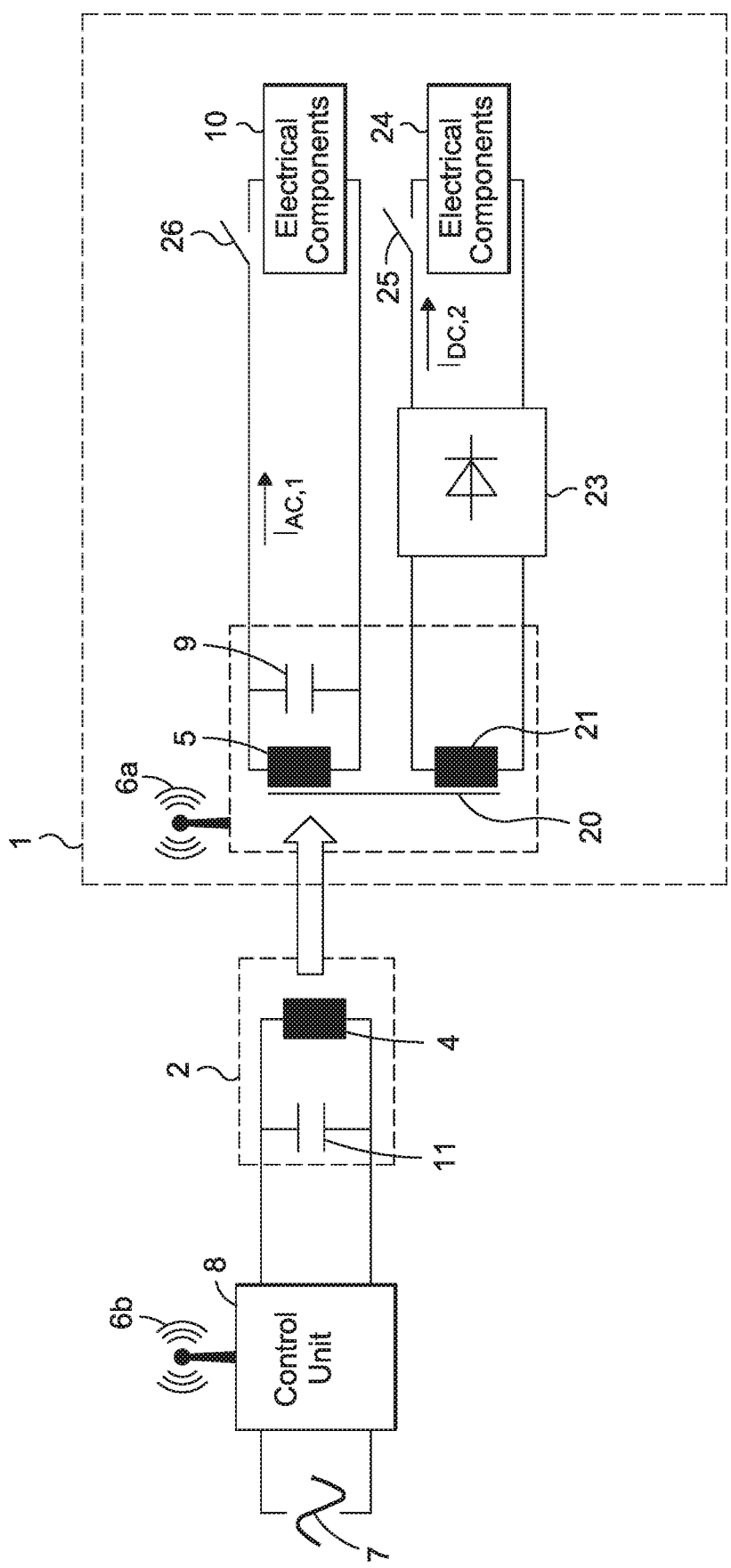
FIG. 2 shows an alternative system for inductively supplying energy to a conventional vehicle.

FIGS. 1 and 2 each show a system which comprises a vehicle (1) and a vehicle-external induction unit (2). The vehicle-external induction unit comprises a primary coil (4) and optionally a resonant capacitor (11).

The vehicle has a vehicle electrical distribution system having a rated voltage level of between 12 volts and 48 volts, which is also referred to as a low-voltage vehicle electrical distribution system owing to this rated voltage level of less than 60 volts. In addition to conventional electrical components such as a vehicle battery, control devices and sensors and actuators for comfort functions (for example electric window winders), the low-voltage vehicle electrical distribution system also comprises a vehicle-specific induction unit (3).

The vehicle-specific induction unit consists of a secondary coil (5) comprising an optional tuning capacitor (9), which can be connected in parallel or in series with the secondary coil. Electrical consumers of the low-voltage vehicle electrical distribution system are combined under the reference symbol (10).

A vehicle as shown in FIG. 1 or 2 can be supplied electric power by virtue of an electromagnetic coupling between the primary coil and the secondary coil. For this purpose, the vehicle needs to be positioned and parked in the region of the vehicle-external induction unit, in a manner comparable to that for a charging operation of a BEV or PHEV. Data interchange between the vehicle and the induction unit is possible by means of communication via a data link between the vehicle and the induction unit, which data link can be in the form of a bidirectional WLAN link (6a, 6b), for example. Similarly to the charging of a BEV or PHEV, electromagnetic coupling between the primary coil and the secondary coil is provided (illustrated by the arrow in FIGS. 1 and 2). The arrow direction shows the path of the electric power from the primary coil to the secondary coil.

The vehicle-external induction unit can be fed from the publicly accessible AC grid (7). A control unit (8) of the induction unit operates, controls and regulates the primary coil and the power transmission between the primary coil and the secondary coil of the stationary vehicle. A controlled variable may be, for example, the energy requirement determined, for example, by an energy management control device in the low-voltage vehicle electrical distribution system and communicated to the induction unit via the WLAN link.

The voltage induced at the secondary coil can be used directly in the vehicle. This means that an alternating current $I_{AC,1}$ is available in the low-voltage vehicle electrical distribution system for supplying electrical consumers in the low-voltage vehicle electrical distribution system. Without any restriction to generality, for example, a heating element of a parking heater can act as an AC consumer.

In addition or as an alternative, as shown in FIG. 1 the alternating current can be transformed to another, preset voltage level via a transformer (13, 14), which can be part of the low-voltage vehicle electrical distribution system, and can be made available to further components of the low-voltage vehicle electrical distribution system as direct current $I_{DC,1}$ via a rectifier (15). This may be, for example, a vehicle electrical distribution system battery (12), which can be configured as a conventional 12 volt lead-acid battery. Thus, the vehicle electrical distribution system battery can be charged when the vehicle is parked.

In accordance with a further option shown in FIG. 2, the secondary coil can have one or more further auxiliary coils (21), which are electromagnetically coupled via a ferrite core (20) to the secondary coil. In this way, the low-voltage vehicle electrical distribution system can be supplied induced electric power over different phases. In accordance with FIG. 2, this results in a supply of alternating current to the component (10) as a result of $I_{AC,1}$ and in a supply of direct current $I_{DC,2}$ to the component (24), which direct current is distributed by a rectifier (23) in the low-voltage vehicle electrical distribution system.

The energy transmission is supported by the resonant capacitors. Resonant circuits with a high Q factor which enables coupling of the primary and secondary coils via a further air gap are produced.

The switches (25) and (26) make it possible to operate different loads individually. For example, a heating element can be disconnected via the switch (25) in order to supply power to a parking function in the 12 volt electrical system (for example data update of the hard drive). Otherwise, power would always be consumed by this heating element.

The advantage of these exemplary embodiments consists in that the charging infrastructure for electric and hybrid vehicles can be used by a conventional vehicle, i.e. a vehicle with a conventional, non-electrified drive train. In this case, the vehicle-side architecture for consuming the electric power, which is completely integrated in the low-voltage vehicle electrical distribution system, can be realized with a lower level of technical complexity in respect of the installation space requirement, the thermal integration, the system complexity, the costs and the weight, than the charging infrastructure in the case of an electric and hybrid vehicle for charging a traction battery.

This means, therefore, that the charging infrastructure for electric and hybrid vehicles is also made usable by conventional vehicles of the exemplary embodiments shown. This results in advantages for the formation and operation of the charging infrastructure since this can be subject to capacity loading to a greater extent and can be operated even more efficiently.

A further extension of the infrastructure is again in favor of the users of electric and hybrid vehicles when they can thus be provided with an even further extended network of charging possibilities.

In addition, conventional vehicles designed in accordance with FIG. 1 or FIG. 2 can be developed by being modified in a variety of ways. For example, a vehicle electrical distribution system battery can be provided with a smaller design given at the same time a high availability of a parking heater. In addition, the energy management of the vehicle can prompt the vehicle user via a check control message to supply electrical energy inductively to the vehicle in order to recharge the vehicle electrical distribution system battery, for example. This contributes to avoidance of breakdown and to a reduction in warranty costs.

In the case of vehicles which are parked for a relatively long period of time (for example over a winter period), the battery needs to be recharged since the battery will slowly discharge owing to the bias currents of the vehicle. If the vehicle is parked over an inductive charging unit, cyclic recharging can automatically take place. In extremely cold countries, for example near the polar circles, the starting ability can also be ensured with a comparatively small vehicle electrical distribution system battery by preheating of the motor even at very low temperatures. This applies despite the extremely unfavorable starting conditions in these areas, which are due to the fact that, as the motor temperature decreases, the amount of power required to start the motor increases and, as the battery temperature decreases, the performance of said battery decreases. In these areas, motor preheaters connected externally via a cable link can be replaced by the proposed infrastructure. In addition, as a result of a reduced warmup phase, the quantity of fuel to be consumed after motor starting can be reduced.

The system for inductive energy supply can also be advantageous for a fleet operator giving vehicles to a wide variety of users. Once a vehicle has been returned, the fleet operator can perform maintenance functions such as software checks or software updates by parking the vehicle over an inductive energy supply system without discharging the vehicle electrical distribution system battery. The fleet operator can also ensure that a vehicle, once it has been returned with a low state of charge of the battery, is transferred to the next user with a full, recharged battery.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
   a vehicle-external induction unit that includes a primary induction coil; and
   a vehicle without an electric engine powering vehicle propulsion and with a low-voltage vehicle electrical distribution system, the low-voltage electrical distribution system comprising:
      a vehicle-internal induction unit that includes a secondary induction coil within which an AC low-voltage is induced by an electromagnetic coupling to the primary induction coil,
      an AC low-voltage consuming electrical load directly connected to the vehicle-internal induction unit such that the induced AC low-voltage is directly provided from the induction unit to the AC low-voltage consuming electrical load,
      a low-voltage battery configured to power the AC low-voltage consuming electrical load,
      a rectifier connected to the vehicle-internal induction unit so as to convert the induced AC low-voltage to a DC low-voltage, and
      a DC low-voltage consuming electrical load connected to the rectifier such that the DC low-voltage is provided to the DC low-voltage consuming electrical load.

2. The system as claimed in claim 1, wherein
   the secondary induction coil is located in an underfloor region of the vehicle,
   the primary induction coil is embodied close to the floor,
   the electromagnetic coupling is produced via an air gap between the primary induction coil and the secondary induction coil when the vehicle is at a standstill, and
   electric power is transmitted from the vehicle-external induction unit to the vehicle when the electromagnetic coupling is produced.

3. The system as claimed in claim 2, further comprising a tuning capacitor connected in parallel with the secondary induction coil, wherein the induced AC low-voltage can be tapped off at said tuning capacitor.

4. The system as claimed in claim 2, wherein
   the vehicle-external induction unit is supplied electric power from an AC voltage grid, and
   a radiofrequency electromagnetic oscillation is set at the primary induction coil by the vehicle-external induction unit.

5. The system as claimed claim 2, wherein the induced AC low-voltage is provided via a transformer that includes a primary transformer coil assigned to the induced AC low-voltage and a secondary transformer coil connected upstream of the rectifier.

6. The system as claimed in claim 1, further comprising a tuning capacitor connected in parallel with the secondary induction coil, wherein the induced AC low-voltage can be tapped off at said tuning capacitor.

7. The system as claimed in claim 6, wherein
   the vehicle-external induction unit is supplied electric power from an AC voltage grid, and
   a radiofrequency electromagnetic oscillation is set at the primary induction coil by the vehicle-external induction unit.

8. The system as claimed claim 6, wherein the induced AC low-voltage is provided via a transformer that includes a primary transformer coil assigned to the induced AC low-voltage and a secondary transformer coil connected upstream of the rectifier.

9. The system as claimed in claim 1, wherein
   the vehicle-external induction unit is supplied electric power from an AC voltage grid, and
   a radiofrequency electromagnetic oscillation is set at the primary induction coil by the vehicle-external induction unit.

10. The system as claimed claim 9, wherein the induced AC low-voltage is provided via a transformer that includes a primary transformer coil assigned to the induced AC low-voltage and a secondary transformer coil connected upstream of the rectifier.

11. The system as claimed in claim 1, wherein the AC low-voltage consuming electrical load is a heating element.

12. The system as claimed claim 1, wherein the induced AC low-voltage is provided via a transformer that includes a primary transformer coil assigned to the induced AC low-voltage and a secondary transformer coil connected upstream of the rectifier.

13. The system as claimed in claim 1, wherein the low-voltage vehicle electrical distribution system has a rated voltage level of 12-16 volts.

14. The system as claimed in claim 1, wherein the secondary induction coil comprises a principle secondary induction coil and an ancillary secondary induction coil identical to the principle secondary induction coil.

15. The system as claimed in claim 14, wherein the principle secondary induction coil and the ancillary secondary induction coil have a common ferrite core.

16. The system as claimed in claim 14, wherein a voltage regulator is connected downstream of the at least one ancillary secondary induction coil.

17. The system as claimed in claim 1, wherein the vehicle-external induction unit is configured to:
- supply electrical energy, via induction, to an internal combustion engine vehicle with a single voltage level electrical distribution system, and
- wherein the vehicle-external induction unit is configured for charging a traction battery of a vehicle with an electrified drive train.

* * * * *